United States Patent

Lenhart et al.

[11] Patent Number: 4,803,106
[45] Date of Patent: Feb. 7, 1989

[54] DISC-SHAPED CARRIER BODY FOR A RECORDING MEDIUM AND METHOD FOR MANUFACTURING SAME

[75] Inventors: Armin Lenhart, Erlangen; Karl-Rupprecht Hub, Donauwörth, both of Fed. Rep. of Germany

[73] Assignee: Siemens Aktiengesellschaft, Berlin and Munich, Fed. Rep. of Germany

[21] Appl. No.: 72,119

[22] Filed: Jul. 10, 1987

[30] Foreign Application Priority Data

Jul. 16, 1986 [DE] Fed. Rep. of Germany ....... 3624061
Aug. 7, 1986 [DE] Fed. Rep. of Germany ....... 3626658

[51] Int. Cl.$^4$ .............................................. G11B 5/704
[52] U.S. Cl. ...................................... 428/64; 65/30.13; 65/30.14; 427/128; 427/129; 427/132; 428/65; 428/141; 428/410; 428/694; 428/900; 428/433; 428/426
[58] Field of Search ............... 428/694, 141, 900, 410, 428/433, 426, 64, 65; 427/128, 129, 132; 65/30.13, 30.14

[56] References Cited

U.S. PATENT DOCUMENTS 3,790,430  2/1974  Mochel ................... 428/410
4,015,045  3/1977  Rinehart ................. 428/410
4,254,189  3/1981  Fisher .................... 428/432
4,411,963 10/1983  Aino ...................... 428/900

FOREIGN PATENT DOCUMENTS 0120413  3/1984  European Pat. Off. .
2749683  5/1979  Fed. Rep. of Germany ...... 428/210

OTHER PUBLICATIONS

"IEEE Trans. Magn.": vol. Mag. 16, No. 1, Jan. 1980, pp. 71–76, vol. Mag. 20, No. 5, Sep. 1984, pp. 657–662, vol. Mag. 20, No. 5, Sep. 1984, pp. 675–680, vol. Mag. 14, No. 5, Sep. 1978, pp. 849–851.
"Glastechnische Berichte", vol. 55 (1982), pp. 171–181.
"Silikattechnik", vol. 32 (1981) 12, pp. 360–362.

Primary Examiner—Ellis P. Robinson
Attorney, Agent, or Firm—Kenyon & Kenyon

[57] ABSTRACT

A disc-shaped nonmagnetic support body for a recording medium which can be magnetized particularly (vertically) has at least one flat side with a very smooth surface, on which at least one magnetizable storage layer can be placed. It should be possible to provide this carrier body readily with appropriate surfaces, and it should be dimensionally stable and sufficiently fracture-proof. A chemically hardened glass substrate is therefore provided which comprises, besides Na$^+$ ions, K$^+$ ions incorporated in zones near the surface and in addition Ag$^+$ ions and/or Ag atoms. For hardening this glass substrate by means of an ion exchange process below the transformation temperature characteristic of the glass material, the substrate is advantageously placed for a predetermined time in a KNO$_3$ melt, to which advantageously, maximally 10% by weight AgNO$_3$ has been added. In addition, the still hot glass substrate taken from the melt again, is advantageously placed in a water vapor atmosphere of above 115° C.

21 Claims, 1 Drawing Sheet

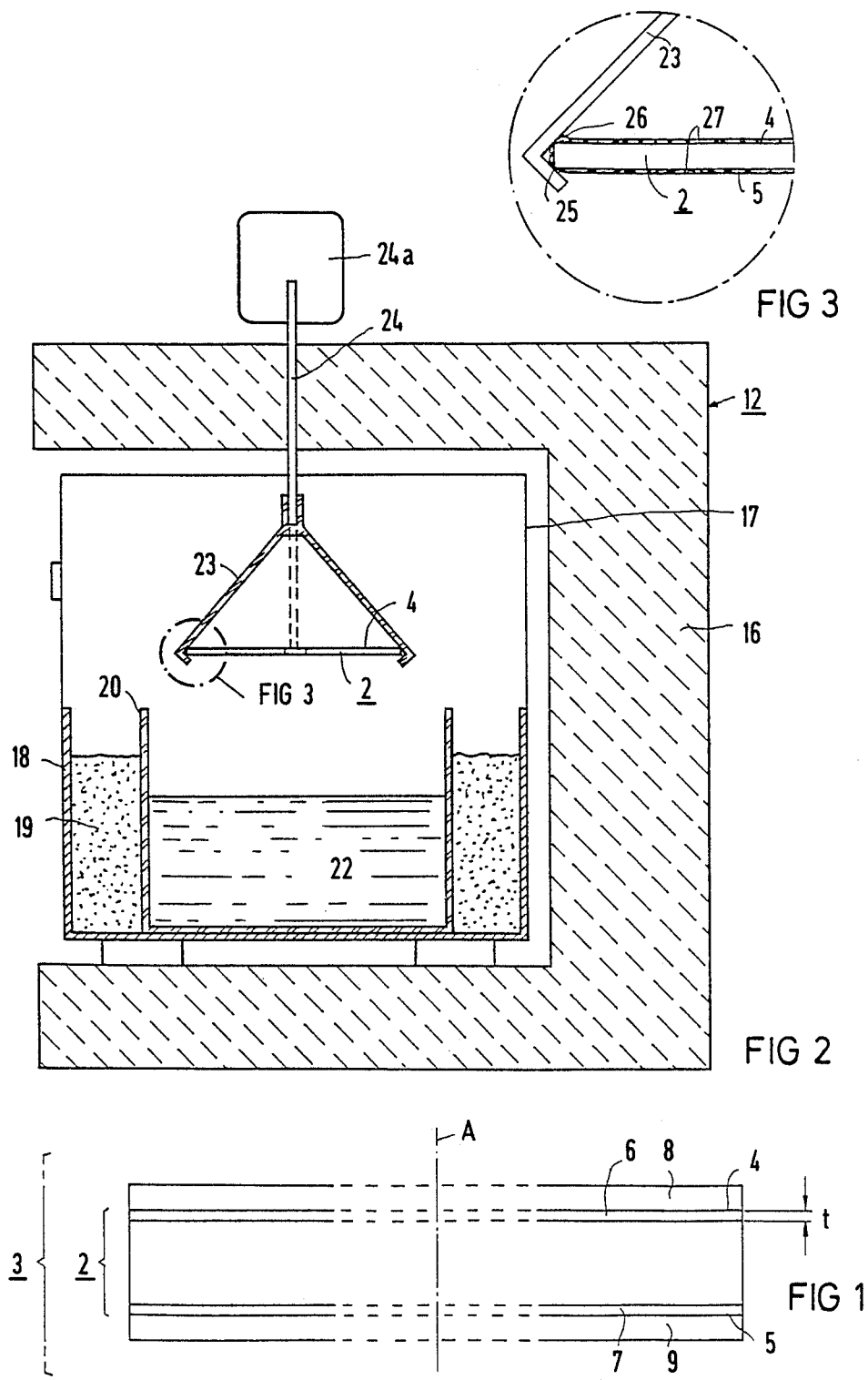

DISC-SHAPED CARRIER BODY FOR A RECORDING MEDIUM AND METHOD FOR MANUFACTURING SAME

BACKGROUND OF THE INVENTION

The present invention relates to a disc-shaped carrier body consisting of nonmagnetic material, for a recording medium which can be magnetized particularly perpendicularly (vertically) and the at least one flat side of which has a very smooth surface, to which at least one correspondingly magnetizable storage layer can be applied. Such a disc-shaped carrier body is known, for instance, from European patent application No. A-0 120 413. The invention further relates to a method for manufacturing such a carrier body.

The principle of vertical magnetization for storing information in appropriate recording media is generally known (see, for instance, "IEEE Transactions on Magnetics", vol. MAG-16, no. 1, Jaunary 1980, pages 71 to 76 or vol. MAG-20, no. 5, September 1984, pages 657 to 662 and 675 to 680). The recording media which must be provided to use this principle, which frequently is also designated as vertical magnetization, can be present, for instance, in the form of rigid magnetic storage discs.

Such a recording medium has at least one storage layer which can be magnetized accordingly, is of predetermined thickness and of a material with vertical magneto-crystalline anisotropy, where the axis of the so-called easy magnetization of this layer is aligned perpendicularly to the surface of the recording medium. Preferred as a corresponding storage material is CoCr (see, for instance, "IEEE Transactions on Magnetics", vol. MAG-14, no. 5, September 1978, pages 849 to 51). By means of special magnetic heads, the individual pieces of information can then be written as bits in successive sections following each other along a track by appropriate magnetization of the storage layer. These bits have a predetermined dimension in the longitudinal direction of the track which is also called the wavelength. As compared to the limit which is given by the demagnetization in the case of storage according to the known principle of longitudinal (horizontal) magnetization, this dimension can be substantially smaller. Thus, the information density in the special recording medium can be increased accordingly by vertical magnetization.

The disc-shaped recording media which are provided on one or both sides with the at least one magnetic storage layer must have extremely smooth (mirror-smooth) surfaces in order to prevent in this manner difficulties with the guidance of the magnetic heads over these surfaces. Particularly for vertical magnetization, the requirements as to the surface quality of the magnetic storage discs increase with the desired higher storage densities and if the guided altitude of the magnetic heads, also called flying altitude, is reduced, since the flying altitude of these heads is generally distinctly less that 1 µm for this magnetizing principle. Consequently, also a sufficiently demensionally stable and strong carrier body or an intermediate layer applied to it, on which then the at least one storage layer must be deposited, must have a correspondingly small surface roughness. The carrier body or its intermediate layer is therefore generally polished to form a correspondingly smooth mirror surface.

Accordingly, in the case of the recording medium which can be gathered from the mentioned European Patent Application, its disc-shaped carrier body of nonmagnetic material such as of a special aluminum alloy is evened-out on at least one of its flat sides, for instance, by diamond facing and lapping. On the thus pretreated carrier body, an intermediate layer of a nonmagnetic very hard material such as nickel-phosphorous with a thickness of about 50 µm is deposited, usually without current. This intermediate layer is subsequently precision-machined by fine-lapping and polishing processes to form a mirror surface with a surface roughness of, for instance, 0.04 µm or less and a thickness of about 30 µm. To this mirror surface, the storage layer of the specially magnetizable metal is subsequently applied, where its axis of easy magnetization is oriented in the direction perpendicular to the surface of the recording medium. On this so obtained stratified structure can finally be deposited a special protective layer. In manufacturing this known recording medium, the process step for polishing the intermediate layer is relatively costly and special intermediate annealing steps must be made.

SUMMARY OF THE INVENTION

It is an object of the present invention to provide a carrier body of the kind mentioned above for a recording medium which can be magnetized in particular, vertically, which can be provided in a relatively simple manner with plane-parallel, mirror-smooth surfaces, remains dimensionally stable for years and has a sufficiently high breaking strength.

The above and other objects of the invention are achieved by a disc-shaped carrier body comprising nonmagnetic material for a recording medium which can be magnetized particularly perpendicularly (vertically) and the at least one flat side of which has a very smooth surface, to which at least one storage layer which can be magnetized accordingly, can be applied, wherein a chemically hardened glass substrate is provided as the carrier body comprising $Na^+$ ions and $K^+$ ions incorporated in zones adjacent to its surfaces, and further comprising at least one of $Ag^+$ ions and Ag atoms.

Glass, such as in particular lime-sodium silicate glass, can be processed very evenly and smoothly and plane-parallel by mechanical and chemical lapping and polishing methods, so that the surface quality of the known discs of an Al-alloy coated with NiP can be obtained or even exceeded without difficulty. In addition, glass is nonmagnetic and can be coated relatively easily by thin-film methods such as sputtering; the tensile strength of untreated glass, however, is so small that sufficient safety against brittle fracture for extended periods of stress cannot be assured. Due to these difficulties the hardening of glass is known per se. To this end, an exchange of small ions of the glass is exchanged for larger ions of a melt or a paste below the so-called transformation temperature of the glass is made in order thus to generate in this manner pressure stress zones at the glass surface (see, for instance, "Glastechnische Berichte", vol. 55 (1982) 8, pages 171 to 181, or "Silikattechnik", vol. 32 (1981) 12, pages 360 to 362). In order to achieve rapid ion transport, high temperatures were generally desired. The danger of possible warping of the glass substrate exists, however. One is therefore compelled to observe temperature and time limits. Then, however, only exchange depths are achievable which correspond to the desired pressure stress zones up to about 40 µm, and tensile strengths of up to 250

N/mm² can be achieved in the known exchange of Na⁺ ions of the glass for K⁺ ions. These tensile strengths and exchange depths, however, are too small for the use of such glasses for disc-shaped carrier bodies of the special recording media. According to the invention, an additional exchange of Na⁺ ions for Ag⁺ ions and/or Ag atoms is therefore provided. This leads advantageously to distinctly higher tensile strengths and substantially more extended exchange depths, so that then, accordingly treated glass substrates can be employed as carrier bodies for the mentioned application.

A method for manufacturing a corresponding carrier body is characterized, according to the invention, by the feature that, for its chemical hardening by means of an ion exchange process below the transformation temperature characteristic of the glass material, the glass substrate is placed for a predetermined time in a $KNO_3$-melt and is finally cooled to room temperature outside the melt. It is advantageous to add to the $KNO_3$-melt a maximum of 10 percent by weight $AgNO_3$. With this method, glass substrates with very great strength can be obtained without adverse effects on their evenness and roughness.

It is particularly advantageous if the still hot glass substrate, removed from the melt, is placed in a water steam atmosphere with a temperature of more than 115° C., since it was found that the occasional occurrence of incipient cracks and crack spreading during the cooling can have its cause in the unavoidable $KNO_3$-residues on the glass surface. This is because the modification of the $KNO_3$ changes twice during the cooling to room temperature, more specifically, at 125° C. and at 115° C. The three modifications have different densities. An increase in volume is connected with the phase transition at 115° C., due to which undesirable tensile stresses can be impressed on the glass material on the part of the $KNO_3$, which can lead to the destruction of the glass. Such tensile stresses are now advantageously prevented by the described measure. In this connection, the strongly hygroscopic property of $KNO_3$ is utilized. Consequently, so much water is absorbed by the $KNO_3$ on the glass substrate in the steam atmosphere, that the hard modifications of the $KNO_3$ with different densities no longer occur or at least are softened. It goes without saying that the glass substrate is still above the temperature at which the phase transition of the $KNO_3$, connected with an increase of volume occurs at the time at which it is exposed to this special atmosphere, as well as this atmosphere itself.

BRIEF DESCRIPTION OF THE DRAWINGS

For a further explanation of the invention, reference is made to the drawings in which:

FIG. 1 is a cross section through part of a recording medium with a carrier body according to the invention;

FIG. 2 shows a device, with which a specific process step of the manufacturing method according to the invention can be carried out; and FIG. 3 shows a portion of a carrier body. In the figures, corresponding parts are provided with the same reference symbols.

DETAILED DESCRIPTION

A glass substrate designated with 2 in FIG. 1 is to serve for the construction of a magnetic storage disc which is provided as a recording medium 3 and is rotation-symmetrical to an axis A; it may have, for instance, the generally customary diameter of 5.25 inches. The material of the glass substrate 2 is a commercially available glass having Na⁺-ions, and in particular, a lime-sodium silicate glass which is also known under the trade name "Floatglas". The glass substrate is to serve for the preparation of a recording medium which can, in particular, be magnetized vertically and must therefore have at least one flat side with a very smooth surface, upon which, at least one correspondingly magnetizable storage layer can be placed. It goes without saying that the glass substrate 2 is also suitable as a carrier for magnetic layers which can be written-on according to the principle of horizontal (longitudinal) magnetization. According to the invention, the glass substrate 2 is to be hardened chemically; in the zones 6 and 7 adjoining both its flat sides 4 and 5, its Na⁺ ions are partially replaced by K⁺ ions, Ag⁺ ions and/or Ag atoms are replaced by an ion exchange. The thickness or depth t of these zones which is shown exaggerated in the figure for reasons of clarity, is here substantially greater than 100 μm, for instance, approximately 150 μm. The two flat sides 4 and 5 of the glass substrate 2 are to have a surface roughness of less than 1 to 2 μm and preferably at most 500 nm. The mentioned values for the surface roughness represent here the maximum permissible deviation of the flat side from a corresponding ideally plane flat side. In order to achieve this flatness, the glass substrate can be machined accordingly by lapping and polishing processes. By this process a surface roughness, defined by the maximum roughness depth R of at most 40 nm and preferably less than 20 nm, referred to a measurement length of 2 mm, can be achieved. The quantity R is understood here to be that distance within a predetermined measuring length which is formed between an upper boundary line which touches the surface profile at its highest profile point, and a lower boundary line which is parallel thereto and touches the surface profile at its lowest part (see also the 1968 draft for DIN 4762).

To these flat sides 4 and 5 treated in this manner are applied in a manner known per se, magnetic layers 8 and 9 which are required for perpendicular (vertical) magnetization and are only indicated in the figure, the axes of easy magnetization of which point in the direction of the normal to the flat sides 4 and 5, and optionally still further layers.

In order to achieve the high tensile strength of at least 350 N/mm² required for use of the glass substrate 2 for the construction of a magnetic storage disc, the glass substrate must be hardened chemically. For this purpose, known methods and devices are taken as the basis. Accordingly, the glass substrate 2 which, after pretreatment steps, has the required minimum roughness and extreme planeness, must be placed for a predetermined time in a melt which contains K⁺ and Ag⁺ and is at a predetermined temperature. The desired exchange between the Na⁺ ions of the glass and the K⁺ and Ag⁺ ions of the melt takes place through diffusion processes in the diffusion zones 6 and 7 near the surface.

In order to achieve the desired ion exchange, a salt melt of $KNO_3$ with maximally 10% by weight and preferably 1 to 4% by weight $AgNO_3$ is heated in a vessel, for instance, a crucible of fused silica, to the desired exchange temperature. The addition of $AgNO_3$ limits the possible exchange temperatures to a range of at most 500° C., since above that, a noticeable $AgNO_3$ decomposition begins. The lower temperature limit is determined essentially by the melting point of $KNO_3$ at 339°, where the addition of $AgNO_3$ and optionally still other substances can lead to a lowering of the minimum temperature to about 300° C. In the case of pastes, the lower temperature limit can be even lower; then, however, the exchange time becomes longer. Advantageously, temperatures between 350° C., and preferably 390° C. are chosen. In this melt is then placed the glass substrate for a predetermined length of time, for instance, between 0.5 and 200 hours, and in particular between 4 and 16 hours. In order to subject the glass substrate to the ion exchange from all sides as uniformly as psssible, it can advantageously be rotated in the melt by means of an appropriate mounting. By the stirring effect, approximately constant exchange conditions are achieved for every point of the substrate. This results in uniform diffusion layers and accordingly, uniform pressure stress zones. It should be noted here that the silver is present in the glass material mainly as metallic silver ($Ag^o$). Since silver atoms have a distinctly larger radius than $Ag^+$ ions, the observed reduction of $Ag^+$ to $Ag^o$ leads to an increase of the volume of the glass components and thereby to a correspondingly increased pressure stress in the glass layers with ion exchange.

If the diffusion profiles of K, Na and Ag in glass substrates treated according to the invention are considered, a profile expected per se is found. The diffusion of the potassium is not influenced noticeably by the silver diffusion. The potassium diffusion profile always reaches about ⅛ to 1/10 of the silver diffusion depth. As can further be expected, the depth of the diffusion profiles increases with an increasing exchange time and exchange temperature. Thus, a temperature increase by 50° K. has about the same influence as quadrupling the exchange time, namely, doubling the diffusion depth. Accordingly, a reduction of the exchange time by about a factor 4 is possible in the case of a $K^+$ and $Ag^+$ exchange as compared to the pure $K^+$ exchange at the same exchange temperature, if one is satisfied with lower strengths of the glass substrate.

In the method according to the invention, the ion exchange may also be possible in an electric d-c voltage field in order to shift the entire diffusion profile in the direction toward the interior of the glass. A corresponding circuit can be designed, for instance, in such a manner that the anode gives off the ions provided for the diffusion, while a reactive cathode takes up the issued $Na^+$ ions. Attention should be directed, however, toward avoiding local charging processes. The maximum voltage is determined here by the heating of the glass specimen.

It was found that a 16-hour ion exchange at 400° C. in a melt of $KNO_3$ and small amounts of $AgNO_3$ increases the strength by about 6-times over corresponding unhardened glass specimens. As compared to samples which are subjected to pure $KNO_3$, the additional increase in strength is still about at least 50%, under otherwise identical conditions. The additional hardening effect due to the admixture of the $Ag^+$ ions depends only little on the $Ag^+$ concentration in the melt. $AgNO_3$ concentrations of 1 to 4% by weight in the melt cause approximately the same diffusion profiles in the glass; for, at the bottom of the corresponding salt bath, the formation of a sump can be observed which assures a silver-saturated bath and thereby, a constant silver concentration.

For manufacturing the glass substrate according to the invention and for carrying out the corresponding method, a device is particularly well suited such as is shown schematically in FIG. 2 in a cross section. This device, generally designated with 12, comprises for this purpose a circulating air oven 16, by which a predetermined temperature level can be generated in a working space 17 which is sealed off in the manner of a vessel. In the working space 17, a collecting vessel 18 with a piling of sand 19 is arranged which surrounds a quartz crucible 20. In the crucible 20 there is a melt 22. According to the invention, a large part of this melt consists of $KNO_3$; at least $AgNO_3$ is added as a further additive. The temperature level of the melt generated by the circulating-air oven 16 is generally between 300° C. and 500° C. The disc shaped glass substrate 2 to be hardened is supported by a mount 23 which permits immersion of the substrate in the melt via a linkage 24. So that the glass substrate is subjected to the ion exchange from all sides as uniformly as possible, it can be rotated advantageously in the melt by means of a motor 24a engaging the linkage 24. After the glass substrate 2 has been in the melt 22 for a predetermined time, generally between 0.5 and 200 hours, and preferably between 4 and 16 hours, it is pulled out of the melt again via the linkage 24. With the cooling process to room temperature subsequent thereto, the danger exists, however, that macroscopic cracks occur in the glass material. Such cracks can be explained by the shrinking behavior of the residues of the melt unavoidably remaining on the glass surface. Such residues are indicated in the portion, shown in FIG. 3, of the glass substrate 2 which remains hanging in the mount 23 after the ion exchange process. The residues are designated in the following as $KNO_3$ residues or $KNO_3$ films, although they also still contain the at least one additive. As can be seen from FIG. 3, bead-like build-ups 26 of the remaining $KNO_3$ film 27 occur at the glass substrate 2, particularly in the vicinity of the points of engagement 25 of the mount 23. In order to prevent tensile stresses in the glass during the cooling period, which are transmitted by the shrinking $KNO_3$ film 26, 27 to the substrate 2, a softening of the $KNO_3$ film is provided according to the invention. To this end, the glass substrate is removed from the working space 17 and is taken to a separate vessel which is flushed with hot water steam. The glass substrate 2 11 should cool down, if possible, only by maximally 100° C. when it is removed from the working space 17. The steam temperature in the separate vessel must be initially above 115° C., where starting temperatures between 200° C. and preferably 250° C. and a temperature of the melt 22 are particularly advantageous. The hygroscopic $KNO_3$ absorbs water at the high temperature and thereby separates from the surface 4 of the glass substrate. Consequently, no additional stresses can be induced in the glass substrate by the $KNO_3$. Cooling subsequent thereto to room temperature can then be carried out in a manner known per se without difficulty. The glass substrate can also remain in the water steam atmosphere, for instance, up to the condensation temperature of the steam.

What is claimed is:

1. A recording medium comprising a disc-shaped carrier body of nonmagnetic material, said carrier body having at least one flat side having a smooth surface, to which flat side at least one storage layer which can be magnetized particularly perpendicularly (vertically) is applied, wherein a chemically hardened glass substrate is provided as the carrier body comprising $Na^+$ ions and $K^+$ ions incorporated in zones adjacent to its surfaces, and further comprising $Ag^+$ ions and Ag atoms, the depth of the surface zones measured perpendicularly relative to the flat sides being greater than 100 μm, the surface roughness of the at least one flat side of the glass substrate provided with the storage layer being less than 2 μm and the maximum roughness depth of the flat side provided with the storage layer of the glass substrate, referred to a measurement distance 2 mm long, being less than 40 nm, said substrate having a content of $Al_2O_3$ which is less than 5%.

2. The carrier body recited in claim 1, wherein, in the surface zones, the share of $Ag^+$ ions and Ag atoms, measured in atom percent, is smaller than the share of the $K^+$ ions.

3. The carrier body recited in claim 1, wherein the surface roughness of the at least one flat side of the glass substrate provided with the storage layer is less than 500 nm.

4. The carrier body recited in claim 1, herein the maximum roughness depth of the flat side provided with the storage layer of the glass substrate, referred to a measurement distance 2 mm long, is less than 20 nm.

5. The carrier body recited in claim 1, wherein the glass substrate comprises a sodium lime silicate glass.

6. A method for manufacturing a recording medium comprising a disc-shaped carrier body of a nonmagnetic material, said carrier body having at least one flat side having a smooth surface, to which flat side at least one storage layer which can be magnetized particularly perpendicularly (vertically) is applied, wherein a glass substrate is provided as the carrier body comprising $Na^+$ ions and $K^+$ ions incorporated in zones adjacent to its surfaces, and further comprising $Ag^+$ ions and Ag atoms, the method comprising the steps of chemically hardening the glass substrate by means of an ion exchange process below the transformation temperature characteristic of the glass material, placing the glass substrate in a $KNO_3$ melt for a predetermined period of time, and cooling the substrate outside the melt to room temperature, the depth of the surface zones measured perpendicularly relative to the flat sides being greater than 100 μm, the surface roughness of the at least one flat side of the glass substrate provided with the storage layer being less than 2 μm, and the maximum roughness depth of the flat side provided with the storage layer of the glass substrate, referred to a measurement distance 2 mm long, being less than 40 nm, said substrate having a content of $Al_2O_3$ which is less than 5% and applying to said at least one flat side said storage layer.

7. The method recited in claim 6, further comprising adding maximally 10% by weight $AgNO_3$ and preferably between 1 and 4% by weight $AgNo_3$ to the $KNO_3$ melt.

8. The method recited in claim 6, wherein the melt is kept at a temperature level of at most 500° C. and preferably at most 420° C.

9. The method recited in claim 8, wherein the melt is kept at temperature level of at least 300° C. and preferably at least 350° C., and in particular of at least 390° C.

10. The method recited in claim 6, wherein the glass substrate is kept in the melt during a time between 0.5 hours and 200 hours, and preferably between 4 and 16 hours.

11. The method recited in claim 6, wherein the glass substrate is moved in the melt and is preferably rotated.

12. The method recited in claim 6, wherein the ion exchange process is performed in an electric d-c voltage field.

13. The method recited in claim 6, wherein the still hot glass substrate atmosphere with a temperature of above 115° C.

14. The method recited in claim 13, wherein the cooling of the glass substrate is carried out, at least in part, in the water vapor atmosphere.

15. The method recited in claim 14, wherein the still hot glass substrate is cooled down in the water vapor atmosphere at least to the condensation temperature of the water vapor.

16. The method recited in claim 13, wherein the glass substrate which is cooled only maximally by 100° C. relative to the temperature of the melt is placed in the water vapor atmosphere.

17. The method recited in claim 13, wherein the still hot glass substrate is placed in the water vapor atmosphere with an initial temperature of at least 200° C. and preferable at least 250° C.

18. The method recited in claim 13, wherein the water vapor atmosphere is developed in a vessel that does not contain the melt by a flushing process.

19. The method recited in claim 6, wherein the surface zones, the share of $Ag^+$ ions and Ag atoms, measured in atom percent is smaller than the share of the $K^+$ ions.

20. The method recited in claim 6, wherein the surface roughness of the at least one flat side of the glass substrate provided with the storage layer is less than 500 nm.

21. The method recited in claim 6, wherein the maximum roughness depth of the flat side provided with the storage layer of the glass substrate, referred to a measurement distance 2 mm long, is less than 20 nm.

* * * * *